United States Patent [19]

Katz

[11] 3,897,548

[45] *July 29, 1975

[54] ORAL COMPOSITIONS FOR RETARDING THE FORMATION OF DENTAL PLAQUE AND METHODS OF UTILIZATION THEREOF

[75] Inventor: Simon Katz, Indianapolis, Ind.

[73] Assignee: Indiana University Foundation, Bloomington, Ind.

[ * ] Notice: The portion of the term of this patent subsequent to July 19, 1989, has been disclaimed.

[22] Filed: Apr. 9, 1973

[21] Appl. No.: 349,274

[52] U.S. Cl. ............................................... 424/54
[51] Int. Cl.$^2$ ........................................ A61K 7/22
[58] Field of Search ........................... 424/49–58

[56] References Cited
UNITED STATES PATENTS

| | | | |
|---|---|---|---|
| 3,666,855 | 5/1972 | Muhler | 424/52 |
| 3,678,153 | 7/1972 | Katz | 424/52 |
| 3,678,154 | 7/1972 | Widder et al. | 424/52 |

FOREIGN PATENTS OR APPLICATIONS

| | | | |
|---|---|---|---|
| 1,186,706 | 4/1970 | United Kingdom | 424/49 |
| 506,291 | 6/1971 | Switzerland | 424/52 |

Primary Examiner—Richard L. Huff
Attorney, Agent, or Firm—Kirkland & Ellis

[57] ABSTRACT

New compositions effective in inhibiting the formation of dental plaque comprise an antibacterial agent in combination with an enamel conditioning agent to facilitate incorporation of the antibacterial agent into the dental enamel. A new method of inhibiting the formation of dental plaque comprises the step of applying such a composition to the oral hard tissues.

2 Claims, No Drawings

ORAL COMPOSITIONS FOR RETARDING THE FORMATION OF DENTAL PLAQUE AND METHODS OF UTILIZATION THEREOF

BACKGROUND OF THE INVENTION

1. Field of the Invention

This invention relates to the dental arts and more particularly to the utilization of compositions comprising antibacterial agents and enamel conditioning agents to inhibit the formation of dental plaque.

2. Description of the Prior Art

Dental plaque is a complex organic film which adheres to and coats the oral hard tissues. The formation and properties of dental plaque are extremely important in the maintenance of oral health since plaque comprises the medium in which dental caries and gingivitis producing bacteria grow. In fact, dental plaque is composed essentially of bacterial colonies growing in an interbacterial organic matrix that provides adherence of the colonies to the teeth and gingiva and coherence of the colonies to one another. Thus, the elimination or inhibition of dental plaque is related to and beneficial in reducing the incidence of dental caries and gingival inflammation.

As is well known to those skilled in the art, dental caries is caused principally by dissolution of enamel in biologically produced intra-oral acids. Such biologically produced intra-oral acids primarily are produced by some of the bacterial colonies that constitute dental plaque. Gingival inflammation, which is the first stage of most severe periodontal diseases is produced by inflammatory end products of plaque bacteria metabolism. Among these bacterial metabolites one can mention hydrolytic enzymes, endotoxins and antigens. Thus, the elimination of the medium which comprises such caries and gingivitis producing bacteria is believed directly to affect the incidence of dental caries and periodontal disease.

The formation of dental plaque is not fully understood but it is known to result from the growth and colonization of various strains of oral bacteria on the surface of the teeth and gingiva. Further, there is belived to be a direct relationship between the ability of dental plaque to induce the precipitation (crystallization) of calcium salts on the surface of the teeth and the formation of dental calculus.

Dental calculus is a hard deposit found on the surfaces of the teeth which results from the precipitation of calcium salts over an organic matrix, primarily plaque. Thus, calculus can be defined as calcified plaque. Calculus is important to dental health since its presence is associated with pathological changes in the bone, gingiva and other supporting periodontel structures. Thus, the elimination and retardation of the formation of dental plaque is an important factor in dental hygienic and health programs not only in the reduction of dental caries and periodontal disease but also the reduction of the formation of dental calculus.

The utilization of antibacterial agents such as atiseptics and germicides for topical application in the oral cavity is well known in the art. By way of explanation, an antiseptic ordinarily is considered to be a substance which stops or inhibits the growth of micoorganisms without necessarily killing them. In contrast, a bacteriocide or germicide is any substance which kills or destroys bacteria. Frequently the difference between bacteriostatic and bacteriocidal effects is a function of the concentration of the antibacterial agents.

Less irritating antiseptics find wide usage for topical application on the oral mucosa for the control of minor infections and on dried mucosa in preparation for needle insertion. Antiseptics too irritating for use on soft tissue find application within the tooth structure for root canal sterilization or cavity medication. Germicides have also been incorporated in commercial mouthwashes, which are medicated liquids used for cleaning the mouth or treating disease states in the oral mucous membrane.

Despite the widely known use of antiseptics and germicides in the oral cavity, previous experience has failed to indicate that such materials had any significant effect in inhibiting the formation of dental plaque even though dental plaque is belived to result from the colonization of oral bacteria on the surface of the teeth and gums. The reasons for this failure are that practically all the antibacterial agents tested so far exert their action in the oral cavity and not specifically on the tooth surface (which is where bacteria colonize) and, in addition, that the duration of the antibacterial effect is rather short, so that the bacterial population of the mouth reaches its previous values shortly after a conventional antibacterial agent is applied.

SUMMARY OF THE INVENTION

In accordance with the subject invention, improved compositions for dental plaque retardation and methods of application thereof have been discovered. Specifically, the improved compositions for plaque retardation comprise a non-toxic and anti-bacterial agent and a non-toxic enamel conditioning agent, as hereinafter described, in amounts effective to inhibit dental plaque formation. The effect of the enamel conditioning agent is to promote the incorporation of the antibacterial agent into the dental hard tissues, thus making these tissues resistant to bacterial colonization and plaque formation.

To be effective in plaque reduction, it was postulated that the antibacterial agent must be held by the hard tissues on the surface of the teeth for sufficient periods of time so that bacterial colonization on these tissues is prevented.

Enamel conditioning agents in accordance with the invention act to soften or loosen the crystal lattice of the dental enamel structure, thereby facilitating incorporation of the antibacterial agent into the enamel lattice. It is often desirable and advantageous to include a precipitating agent in the present invention to facilitate and speed up the rehardening of the enamel after treatment. Both fluorides and phosphates act as a precipitating agent and may be incoporated into the present invention. Fluoride ions cause a precipitation of calcium phosphate in apatite form, and thus, aid in hardening the enamel after treatment. Phosphate ions act to cause an over balance of the equilibrium during treatment in the oral cavity thus aid and speed up the rehardening process of the enamel. Since certain enamel conditioning agents already incorporate fluorides and or phosphates, it is not always necessary to provide a separate precipitating agent. Other precipitating agents include sources of ions of tin (II), calcium, aluminum, vanadium, and silicon, all of which result in precipitation and reclosure of the enamel lattice.

The foregoing compositions may be provided in combination with carriers suitable for use in the oral cavity. Such carriers include, in the case of dentifrices and prophylaxis pastes, cleaning and polishing agents and other constituents ordinarily provided in such compositions. In the case of topical solutions and mouthwashes, suitable carriers include water and other liquids. Other carriers include various compatible plastics (e.g., nylon, polyethylene, polypropylene and the like) and other materials (e.g., natural bristles, wood, etc.) which may be formed into toothbrushes or interdental stimulators and thus utilized to apply the active agents of the present invention to the oral hard tissues. Also, other carriers include waxes, plastics or other adhesives used on dental flosses and tape, or chewing gum which contact the oral hard tissues during use or consumption. Indeed, substantially any device or implement capable of supplying the active agents to the oral hard tissues may serve as a suitable carrier in accordance with this invention.

Thus, it is a principal object of the present invention to provide improved compositions for plaque retardation which inhibit the formation of dental plaque on the oral hard tissues.

A further object of the present invention is to provide improved compositions for plaque retardation characterized by the inclusion of an enamel conditioning agent in combination with an antibacterial agent which inhibits the formation of dental plaque thereby reducing the incidence of dental caries and periodontal disease and the formation of dental calculus.

A still further object of the present invention is to provide a new method of inhibiting the formation of dental plaque on the oral hard tissues characterized by the application of compositions including an enamel conditioning agent in combination with an antibacterial agent to the oral hard tissues.

DETAILED DESCRIPTION OF THE PREFERRED EMBODIMENTS

This invention concerns the utilization of compositions which comprise a non-toxic enamel conditioning agent and a non-toxic antibacterial agent in amounts effective to inhibit dental plaque formation. The enamel conditioning agent acts to soften or loosen the crystal lattice of the dental enamel, thereby factilitating the incorporation of the antibacterial agent therein.

Suitable non-toxic enamel conditioning agents include acids, such as orthophosphoric acid, acetic acid, boric acid, and orthosilicic acid, and calcium ion chelating agents such as fumaric acid; tartaric acid; methyliminodiacetic acid; difluoroxalatostannate (II) complexes; (e.g., potassium difluoroxalatostannate, sodium difluoroxalatostannate, and ammonium difluorokaltostannate) hydroxyethyl tetraacetic acid; diethylenetriamine pentaacetic acid; hydroxyethylene diamine triacetic acid; ethylene glycol bis (B-amimoethylene) tetraacetic acid; cyclohexane diamine tetraacetic acid; ethylenediamine tetraacetic acid (EDTA); adipic acid; glutaric acid; and polyphosphates, such as disodium ethane-1-hydroxy-1, 1-diphosphonate (EHDP), and amonium salts of condensation products of ammonia and phosphorus pentoxides, e.g.,

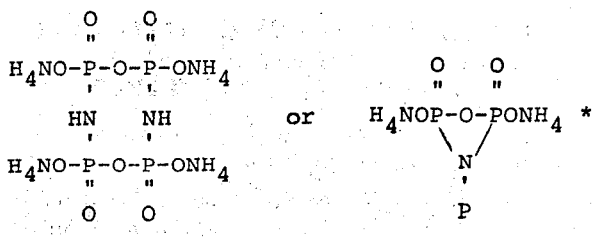

and mixtures thereof. Difluoroxalatostannate (II) complexes, fumaric acid, Victamide, and EHDP are preferred enamel conditioning agents in accordance with this invention.

\* These complexes and their preparation are disclosed in U.S. Pat. No. 3,678,153.

\* These salts and a mode of preparation thereof are set forth and described in U.S. Pat. No. 2,122,122. Such salts are commercially available from the Stauffer Chemical Company under the trademark "Victamide" and are hereinafter referred to by the Victamide name.

Suitable non-toxic antibacterial agents include phenols; bisphenols (such as hexachlorophene); halogenated salicylanilides and carboxianilides [such as TBS (tribromosalicylanilide) and fluorophene (3,5-dibromo-3'-trifluoromethylsalicylanilide]; p-aminosalicyclic acid; p-aminobenzoic acid; malonates; heavy metals (e.g., mercury) and any other relatively non-toxic agent capable of retarding or inhibiting bacterial growth, or producing the death of bacteria. Frequently, the performance of one or the other of these objectives can be achieved with the same compound as a function of its concentration.

Fluorophene and TBS are preferred antibacterial agents in accordance with this invention.

While not limited to any particular theory or mechanism of action, it is believed that the presence of the enamel conditioning agent in the compositions of the present invention serves to enhance the uptake of antibacterial agents by dental enamel in the following manner. Treatment of the dental enamel with an enamel conditioner (i.e., acid or chelating agent) expands the enamel crystal lattice (i.e., produces a slight dissolution of the dental enamel thereby causing a slight loosening of the crystal lattice). Antibacterial agents present in the treatment medium thus have access not only to the surface of the enamel crystals but also to the partially dissolved tissue, i.e., they are free to penetrate deeper into the enamel lattice where they are trapped during the reprecipitation phase of the enamel conditioning process. Thus, as used herein, the term "enamel conditioning agent" means any calcium ion chelating agent, acid or other agent capable of expanding (i.e., dissolving and/or loosening) the dental enamel crystal lattice to facilitate uptake of the antibacterial agent, followed by a mechanism to provoke the subsequent reprecipitation and rehardening of the slightly dissolved tissue.

Reprecipitation of the dissolved apatite crystals and the final retightening of the crystal lattice may be obtained in several ways. An ideal agent for reprecipitation is fluoride, which promotes the crystallization of calcium phosphate solutions. Fluoride substitutes for OH in the apatite lattice, and produces a decrease in the unit cell parameters and an improvement in the crystallinity of the tissue. Thus, stannous fluoride, sodium fluoride and other water soluble fluorides may be used, with the fluoride acting to cause calcium phosphate to precipitate. Also suitable are soluble phosphates such as alkali metal phosphates and $P_2O_5$, with the phosphate ions acting to force the reaction equilibrium toward rehardening of the enamel. Other suitable precipitating agents include soluble calcium, tin (II), aluminum, vanadium, and silicon ion containing sources which serve to enhance reclosure of the crystal lattice.

In the case of certain enamel conditioning agents which contain fluoride or phosphate or other such ions, (e.g., difluoroxalatostamate (II) complexes, Victamide, EHDP and the like), no separate precipitating agent need be employed (i.e., the enamel conditioning agent both loosens the enamel crystal lattice to facilitate uptake of the antibacterial agent and it returns the crystal lattice to its tightened configuration incorporating the antibacterial agent). Other ions present in the oral environment (e.g., fluoride and/or stannous ions) may also be incorporated into the enamel in the same manner.

Fluoride, phosphate, and other precipitating agents in accordance with this invention, where required, may be provided at levels of greater than 0 up to about 1.0% by weight of the composition.

When applied to the teeth, the compositions of the invention exhibit effectiveness in retarding and eliminating the formation of dental plaque from the dental surfaces and contiguous gingival surfaces, thereby reducing the media in which caries and periodontal disease producing bacteria grow and further reducing or eliminating one of the constituents of dental calculus.

The foregoing compositions comprising an enamel conditioning agent, antibacterial agent, and, in certain cases a precipitating agent are preferably applied to the oral hard tissues by means of a carrier suitable for use in the oral cavity. Suitable carriers include, in the case of dentifrices and prophylaxis pastes, cleaning and polishing agents and other constituents ordinarily provided in such products. In the case of topical solutions and mouthwashes, suitable carriers include water and other liquids. Other carriers include various compatible plastics (e.g., nylon, polyethylene, polypropylene and the like) and other materials (e.g., natural bristles, wood, etc.) which may be formed into toothbrushes or interdental stimulators and thus utilized to apply the active agents of the percent invention to the oral hard tissues. Also, other carriers include waxes and/or plastics and/or any other adhesives used on dental flosses and tapes or chewing gum which contact the oral hard tissues during use or consumption. Indeed, substantially any device or implement capable of supplying the active agents to the oral hard tissues may serve as a suitable carrier in accordance with this invention.

Generally speaking, the enamel conditioning agent is present in the oral compositions of this invention at a level of about 0.01% up to about 10%, preferably about 0.1–2.5% by weight of the composition. The antibacterial agent is present in such compositions at a level of about 0.01% up to about 5.0%, preferably about 0.1–2% by weight of the composition. Where employed, the precipitating agent is present at a level of greater than 0 up to about 1.0% weight of the composition.

DENTIFRICE PREPARATIONS

Compositions adapted for regular home use such as dentifrice preparations and the like typically comprise about 20–95% by weight of a compatible cleaning and polishing agent as a carrier suitable for use in the oral cavity. The enamel conditioning agent content of a dentifrice should be from about 0.01% up to about 5.0%, preferably from about 0.1 to 2.5 by weight of the dentifrice preparation. The antibacterial agent content should be from about 0.01% to about 5.0% and preferably from about 0.1 to 1.0% by weight.

Various compatible cleaning and polishing agents suitable for use in the dentifrice embodiments of this invention are known in the art, including insoluble sodium metaphosphate, calcium pyrophosphate, calcium hydrogen phosphate dihydrate, anhydrous calcium hydrogen phosphate, and substantially water impervious cross-linked thermosetting highly polymerized synthetic resins (e.g., melamine formaldehyde resins) as described in U.S. Pat. No. 3,070,510. Preferably, zirconium silicate or mixtures of zirconium silicate with other cleaning and polishing agents (e.g., talc) as set forth and described in U.S. Pat. No. 3,450,813 may be used as the cleaning and polishing agent. Also, mixtures of such polishing agents may also be employed. The dentifrice preparations may be prepared in a conventional manner and will usually include additional ingredients to render the overall composition commercially acceptable to consumers.

Dentifrices require a binder substance to impart desired textural properties. Natural gum binders such as gum tragacanth, gum karaya, gum arabic, etc. and seaweed derivatives such as Irish moss and alginates, and water soluble cellulose derivatives, such as hydroxyethyl cellulose and sodium carboxymethyl cellulose can be used for this purpose. Desirably, those materials are employed which are most compatible with the chelating agent and the antibacterial agent. Binders which have no ionic groups, such as hydroxyethyl cellulose are especially preferred. Improvements in texture can also be attained by including an additional material such as colloidal magnesium aluminum silicate. Thickening agents in an amount of from 0.5 to 5.0% by weight can also be used to form a satisfactory dentifrice.

Dentifrices conventionally contain sudsing agents. Suitable sudsing agents include, but are not limited to, water soluble alkyl sulfates having from 8 to 18 carbon atoms in the alkyl radical, such as sodium lauryl sulfate, water soluble salts of sulfonated monoglycerides of fatty acids having from 10 to 18 carbon atoms in the alkyl radical such as sodium coconut monoglyceride sulfonate, salts of fatty acid amides of taurines such as sodium-N-methyl palmitoyl tauride, and salts of fatty acid esters of isethionic acid. Sudsing agents can be used in compositions of this invention in an amount of from about 0.5% to about 5.0% by weight of the total composition.

It is also desirable to include some humectant material in a dentifrice to keep it from hardening. Materials commonly used for this purpose include glycerine, sorbitol, and other polyhydric alcohols. The humectants can comprise up to 35% of the toothpaste composition.

Flavoring materials may be included in dentifrice formulations including small amounts of oils of wintegreen and peppermint and sweetening agents such as saccharin, dextrose, and levulose.

Preferred antiplaque dentifrice preparations are given hereinafter by way of examples are presented for the purpose of illustration but not of limitation.

EXAMPLE I

| | % By Weight |
|---|---|
| Fluorophene | 0.25 |
| Polyethylene glycol 400 | 2.0 |
| Fumaric Acid | 0.15 |
| Potassium biphtalate | 1.200 |
| Water | 25.0 |
| Glycerin | 10.0 |
| Sorbitol | 20.0 |
| Sodium Alkyl sulfate | 0.7 |
| Veegum | 0.4 |
| Carboxymethycellulose | 1.5 |
| Saccharin | 0.1 |
| Flavoring agent | 0.7 |
| Zirconium Silicate | 8.0 |
| Calcium pyrophosphate | 30.0 |
| | 100.00 |

EXAMPLE II

| | % By Weight |
|---|---|
| TBS | 0.20 |
| Tween 80 | 2.0 |
| Potassium difluoroxolatostannate | 0.8 |
| Hydroethylenetetraacetic acid | 0.1 |
| Potassium Acetate | 2.0 |
| Water | 20.0 |
| Glycerin | 15.0 |
| Sorbitol | 15.0 |
| Veegum | 0.4 |
| Carboxymethylcellulose | 2.0 |
| Titanium dioxide | 1.0 |
| Saccharin | 0.1 |
| Flavor | 0.4 |
| Plastic abrasive | 41.0 |
| | 100.00 |

EXAMPLE III

| | % By Weight |
|---|---|
| Hexachlorophene | 0.50 |
| Fumaric Acid | 0.28 |
| Sodium Fluoride | 0.22 |
| Water | 20.0 |
| Glycerin | 15.0 |
| Sorbitol | 15.0 |
| Sodium aryl sulfonate | 0.8 |
| Veegum | 0.5 |
| Carboxymethylcellulose | 1.5 |
| Coloring agent | 0.3 |
| Flavoring agent | 0.8 |
| Saccharin | 0.1 |
| Insoluble sodium metaphosphate | 45.0 |
| | 100.00 |

PROPHYLACTIC PASTE COMPOSITIONS

Compositions of the present invention include, in addition to the described dentifrice preparations, prophylactic paste compositions adapted for relatively infrequent application (e.g., once or twice a year), either professionally (i.e., by a dentist or dental hygienist) or by self-application under professional supervision. Prophylactic paste composition generally differs from a dentifrice composition in that the cleaning and polishing component thereof is more abrasive (and as a result, is a better tooth cleaner). Since a prophylactic paste composition is applied only once or twice per year, a more abrasive cleaning and polishing agent may safely be employed therein than in a dentifrice preparation (i.e., if the more abrasive cleaning and polishing agent were used in a dentifrice preparation adapted for frequent application, the agent might permanently damage the oral hard tissues).

The compatible substances previously described as suitable cleaning and polishing agents for incorporation in dentifrice preparations may also be employed as the cleaning and polishing component of prophylactic paste compositions. However, in order that the desired optimal level of cleaning and polishing effectiveness be obtained, a different particle size and surface configuration for the substance is needed. For example, a suitable zirconium silicate preparation for use in a dentifrice preparation is disclosed and claimed in U.S. Pat. No. 3,450,813, and suitable zirconium silicate cleaning and polishing agents for use in a prophylactic paste composition is described and claimed in U.S. Pat. Nos. 3,257,282 and 3,330,732.

Other suitable cleaning and polishing agents include mixtures of zirconium silicate and tin dioxide (as set forth and described in U.S. Pat. No. 3,378,445), lava pumica, silica powder, calcium carbonate, and the like.

Prophylactic paste compositions in accordance with the present invention are formulated from about 0.01 to about 10 and preferably about 0.1–2.5 of an enamel conditioning agent and about 0.01 to about 5.0% and preferably about 0.1–1.0% of an anti-bacterial agent. The cleaning and polishing agent serves as a carrier and is employed with a range of about 20 to 80% by weight depending on the particular formulations as is well known to one skilled in the art.

The prophylactic paste compositions are prepared in a conventional manner and usually include additional ingredients that render the overall composition commercially acceptable. For example, prophylactic paste compositions typically embody conventional components such as bleaching agents, binders, humectants, flavoring agents and the like. Preferred prophylactic paste compositions produced in accordance with the present invention are given hereinafter in Examples IV to VI but it should be understood that the Examples are presented for the purpose of illustration, but not of limitation.

EXAMPLE IV

| | % By Weight |
|---|---|
| Fluorophene | 0.5 |
| Victamide | 5.0 |
| ZrSiO$_4$ | 50.0 |
| SnO$_2$ | 10.0 |
| Water | 19.5 |
| Glycerin | 4.0 |
| Sorbitol | 8.0 |
| Veegum | 1.0 |
| Keltrol | 1.0 |
| Saccharin | 0.2 |
| Flavoring agents | 0.8 |
| | 100.00 |

EXAMPLE V

| | % By Weight |
|---|---|
| Zephiran 1:100 | 10.0 |
| Methyliminodiacetic acid | 0.5 |
| Zirconium silicate | 60.0 |
| Water | 14.0 |
| Glycerin | 5.0 |
| Sorbitol | 7.5 |
| Keltrol | 1.0 |
| CMC | 1.0 |
| Coloring agent | 0.3 |
| Saccharin | 0.2 |
| Flavoring agent | 0.5 |
| | 100.00 |

EXAMPLE VI

| | % By Weight |
|---|---|
| TBS | 0.5 |
| Fumaric acid | 0.2 |
| Potassium difluoroxolatostannate | 2.0 |
| Hydrated alumina | 40.0 |
| ZrSiO$_4$ | 24.3 |
| Water | 16.0 |
| Glycerin | 4.0 |
| Sorbitol | 8.0 |
| CMC | 1.0 |
| Veegum | 1.0 |
| Titanium dioxide | 2.0 |
| Saccharin | 0.2 |
| Flavoring agents | 0.8 |
| | 100.00 |

OTHER COMPOSITIONS

In addition to dentifrices and prophylactic pastes, the present invention may be used in conjunction with other compositions (e.g., topical solutions and mouthwashes) comprising enamel conditioning agents in the range of about 0.1–5.0% and antibacterial agents in the range of about 0.01–2.5% as shown in the following Examples.

EXAMPLE VII

TOPICAL SOLUTION

| | % By Weight |
|---|---|
| Sodium Fluoride | 2.0 |
| Fluorophene | 0.5 |
| Fumaric acid | 0.2 |
| Flavoring agent, sweetener | 0.3 |
| Water | 97.0 |
| | 100.00 |

EXAMPLE VIII

MOUTHWASH PREPARATION

| | % By Weight |
|---|---|
| Fluorophene | 0.25 |
| Tween 80 | 2.0 |
| Potassium difluoroxolatostannate | 0.8 |
| Fumaric acid | 0.2 |
| Alcohol | 4.0 |
| Sorbitol | 90.0 |
| Glycerin | 10.0 |
| Flavor and color | 0.25 |
| Distilled Water | 42.50 |
| | 100.00 |

In addition to the above carriers, the present invention may be used in conjunction with various other carriers which contact the oral hard tissues during normal use. For example, typically the bristles (either plastic or natural) of a toothbrush, the surfaces of plastic or wooden interdental stimulator, and the surfaces of a rubber or plastic dental prophylaxis cup come into close contact with the oral hard tissues, and thus provide a suitable carrier for the active agents of the present invention, with such agents being impregnated in or coated on such carriers.

Similarly, dental flosses and dental tapes utilized to clean the interproximal surfaces of the teeth typically include a waxy, plastic or other material which serves as a carrier for the active agents of the present invention. Typically, such wax may be a water insoluble wax (e.g., paraffin) or a water soluble wax (e.g., polyethylene glycol, polyethylene oxide, polypropylene oxide, methylcellulose and mixtures thereof). Plastics such as vinyl acetate and adhesives such as polyvinyl alcohol are examples of other carriers.

In the same manner, an insoluble chewing gum base may be used as the carrier in compositions in accordance with the present invention. Chewing gums in accordance with this invention include about 0.1–2.5% by weight of an enamel conditioning agent and about 0.01–1.0% by weight of an antibacterial agent.

Suitable conventional stick gum bases (i.e., as opposed to bubble gum bases) include "Paloja"; "Firm Paloja"; "Berguna"; and "Dreyco", all available from the L. A. Dreyfus Corporation, P.O. Box 500, South Plainfield, N.J., and "Synthetic Base No. 2939" and "Natural Base No. SC319," which have been obtained from the American Chicle Company, New York, N.Y.

In general, Firm Paloja, Synthetic Base No. 2939, Berguna, and Dreyco are preferred chewing gum bases.

Suitable bubble gum bases include: "D.C."; "Extra Soft"; "Oak"; "Grande"; "Soft Ideal"; "Ideal"; "Model"; and "Ladco", all available from the L. A. Dreyfus Corporation. Bubble gums employing Oak, Soft, Extra Soft, and D.C. are considered to be the preferred bubble gum bases. Chewing gums bases are present in gums at a level of about 10–40% by weight.

Chewing gums also typically comprise excipient constituents such as any of the convention flavoring and sweetening components of a level in the range of about 40–70% by weight. Flavors such as spearmint, peppermint, wintergreen, fruit flavors, and the like may be used. Suitable sweeteners include sorbitol, corn syrup, and sugar.

Inert filling ingredients, such as mannitol, glycerin, lecithin, or the like are provided in order to contribute to the over-all consistency of the composition.

The foregoing gum bases, excipients, and fillers are all known chewing gum constituents, and are provided at conventional levels, and therefore per se form no part of the present invention.

Typical examples of exemplary chewing gums produced in accordance with the present invention are given in the following Examples.

EXAMPLE IX

| | % By Weight |
|---|---|
| Fluorophene | 0.05 |
| Fumaric acid | 0.10 |
| Gum base | 19.4 |
| Corn syrup | 19.65 |
| Sucrose | 59.7 |
| Glycerin | 0.5 |
| Flavor | 0.6 |

EXAMPLE X

| | % By Weight |
|---|---|
| TBS | 0.10 |
| Tartaric acid | 0.20 |
| Gum base | 27.70 |
| Sorbo | 22.5 |
| Glycerin | 0.5 |
| Sorbitol | 48.0 |
| Flavor | 1.0 |

EXPERIMENTAL EVALUATIONS

The physical properties and the antiplaque effectiveness of the oral compositions of the present invention have been demonstrated by laboratory studies designed to measure: (1) whether or not the oral compositions of the present invention in fact incorporate the antibacterial agent into the dental hard tissues (particularly enamel) structure and thus render these tissues resistant to bacterial colonization; (2) the antiplaque effectiveness of the present invention; and (3) the toxicity of the present invention.

Three types of studies were conducted to determine the effectiveness of the present invention in incorporating an antibacterial agent into dental hard tissues; namely:

a. chemical determination of the incorporation of the antiplaque agent into enamel treated with the present invention;
b. studies showing lack of bacterial colonization on dental enamel treated with this invention;
c. studies showing the antibacterial properties of powdered dental enamel treated with this invention.

In the chemical determination of the incorporation of the antibacterial agent into enamel, three different experiments were conducted.

The first experiment conducted was to determine the effect of enamel conditioning agents upon the incorporation of fluorophene into powdered enamel to establish whether or not enamel conditioning agents promote the incorporation of flurophene into powdered enamel. Enamel was separated according to the procedure of Manly and Hodge, J.Dent.Res. 18:133, 1939. Samples of 2.5 g of enamel powder were treated for five hours with 25 ml of different fluorophene containing enamel conditioning and non-enamel conditioning systems, under constant stirring in a revolving wheel. After the treatment, the powdered enamel was separated by filtration under suction using No. 40 Whatman filter paper and carefully washed 3 times with 80 ml of redistilled water. The samples were then subjected to acetone extraction by stirring them for 3 hours in the revolving wheel in 30 ml acetone. After filtration through a No. 40 Whatman filter paper, the solvent was allowed to evaporate at room temperature until the volume was reduced to 2.0 ml. The concentrated solutions were then analyzed by two dimensional paper chromatography, using the following solvents: First dimension: methyl alcohol-acetone 19:1; Second dimension: acetone-methyl alcohol-acetic acid 10:10:1. A 10 × 10 cm No. 5 Whatman paper was used for this analysis, the time for each run being 15 minutes. The chromatographic pattern was depicted using an ultraviolet light. A run was conducted using 0.25% solution of fluorophene in acetone to obtain a control pattern for fluorophene alone. The systems used in this study are as follows:

TABLE I

| | | In Grams |
|---|---|---|
| System 1 | | |
| | Tween 80* | 80.0 |
| | Distilled Water | 20.0 |
| System 2 | | |
| | Tween 80* | 20.0 |

TABLE I-Continued

| | | In Grams |
|---|---|---|
| | Fluorophene | 0.25 |
| | Distilled Water | 79.75 |
| System 3 | | |
| | Tween 80* | 20.0 |
| | Fluorophene | 0.25 |
| | Fumaric Acid | 0.15 |
| | Distilled Water | 79.60 |
| System 4 | | |
| | Tween 80* | 20.0 |
| | Fluorophene | 0.25 |
| | Fumaric Acid | 0.15 |
| | $SnF_2$ | 0.413 |
| | $K_2C_2O_4.H_2O$ | .486 |
| | Distilled Water | 78.711 |
| System 5 | | |
| | Tween 80* | 20.0 |
| | Fluorophene | 0.25 |
| | Fumaric Acid | 0.15 |
| | $SnF_2$ | 0.413 |
| | $K_2C_2O_4.H_2O$ | 0.486 |
| | $P_2O_5$ | 0.500 |
| | $NH_4OH$ | 0.500 |
| | Distilled Water | 77.711 |

*Tween 80 is a commercially available surfactant for decreasing surface tension, and comprises a solution of polyoxyethylene sorbitan monooleate. Tween 80 is manufactured by Atlas Chemical Industries Inc.

The results of this test showed that the control 0.25% fluorophene solution gave a chromatographic pattern similar to those produced by Systems 3, 4, and 5 (two U.V. spots), when subjected to the ultraviolet light. Systems 1 and 2 produced a single spot (probably due to Tween 80) which shows that under this experimental condition only enamel conditioning agent-containing systems produce incorporation of fluorophene into powdered enamel.

The second experiment conducted was to determine the quantitative amount of fluorophene incorporated into powdered enamel when used in enamel conditioning agent containing systems.

Ultraviolet spectrophotometry was used for the determination of fluorophene removed by acetone extraction from enamel treated with different enamel conditioning and non-enamel conditioning systems containing fluorophene. The enamel powder to be used in this experiment was obtained in the manner previously described.

A preweighed 0.1 g sample of fluorophene was placed in a 100 ml volumetric flask and diluted to the mark with methyl alcohol. Duplicate specimens of 1.0, 2.0, 3.0, 4.0, and 5.0 ml of the solution was transferred into 150 ml beakers, and each was diluted to approximately 95 ml with alcohol. The pH of one of the specimens within each pair was adjusted to pH 9–10 with 0.01 N KOH. The second specimen was adjusted to pH 4–5 with 0.01 N HCl. Each specimen was then finally diluted to 100 ml using a volumetric flask and methyl alcohol. 1.0 ml of the first aliquot adjusted to pH 4–5 was placed in the 1 $cm^3$ reference call of a Perkin-Elmer spectrophotometer. 1.0 ml of the specimen within the same pair adjusted to pH 9–10 was placed in the 1 $cm^3$ sample cell. The differential ultraviolet absorption curve for each pair of the samples was run to determine the standard curve at 295 $\mu m$ (absorption maxima).

Results for the Standard Curve:

TABLE II

| Amount of Fluorophene ($\mu g$) | Optical Density pH 9–10 | Optical Density pH 4–5 | Differential Optical Density | Shifted (Corrected) Optical Density |
|---|---|---|---|---|
| 0 | −0.040 | −0.035 | −0.005 | 0.0 |
| 10 | 0.065 | 0.065 | 0.0 | 0.005 |

TABLE II – Continued

| Amount of Fluorophene (μg) | Optical Density pH 9–10 | pH 4–5 | Differential Optical Density | Shifted (Corrected) Optical Density |
|---|---|---|---|---|
| 20 | 0.070 | 0.065 | 0.005 | 0.010 |
| 30 | 0.075 | 0.065 | 0.010 | 0.015 |
| 40 | 0.080 | 0.065 | 0.015 | 0.020 |
| 50 | 0.085 | 0.065 | 0.020 | 0.025 |

Enamel powder samples were treated using the procedure previously described and set forth in TABLE I. 1.0 g of treated enamel powder was extracted for three hours with 30 ml acetone in a revolving wheel. After careful filtration through a No. 40 Whatman filter paper, the extract was concentrated by room temperature evaporation to 10 ml. The pH of one specimen within the different pairs was adjacent to pH 9–10 and the other to pH 4.5 with 0.01 N KOH and HCl respectively. The volume of all specimens was then adjusted with alcohol to 25.0 ml in a volumetric flask. 1.0 ml of the pH 4–5 solution was transferred to the reference cell and 1.0 ml of the pH 9–10 solution was transferred to the sample cell. The differential ultraviolet absorption curve at 295 μm was read and recorded for each pair. The amount of fluorophene was calculated by relating the recorded readings to the standard curve. The results of this test are illustrated in TABLE III.

TABLE III

| Treatment System | μg Fluorophene in U.V. Sample | Total Fluorophene (μg) in 1.0 g of treated enamel (dilution factor: 50) |
|---|---|---|
| 1. Distilled Water + Tween 80 | 0 | 0 |
| 2. 1 + 0.25% Fluorophene | 10 | 500.0 |
| 3. 2 + 0.15% Fumaric Acid | 51 | 2550.0 |
| 4. 3 + 0.85% $K_2[SnF_2(C_2O_4)]$ | 20 | 1000.0 |
| 5. 4 + 0.5% $P_2O_5$ + 0.5% $NH_4OH$ | 20 | 1000.0 |

These data indicate that under this experimental condition, enamel conditioning agent containing systems increase markedly the incorporation of fluorophene into powdered enamel.

In order to further determine the effectiveness of the present invention in incorporating an antibacterial agent into the oral hard tissue, the following test procedure was followed (using hexachlorophene as a typical antibacterial agent). The labial surface of bovine incisors with 100 milliliters of acetone, and subjected to hexachlorophene extraction for four hours. The aliquots of each were then analyzed spectrophotometrically utilizing the following procedure. A 2 milliliter aliquot of the acetone extract was added to a 25 milliliter volumetric flask. Five milliliters of a 2% solution of 4-aminoantipyrine was then added. The solution was then diluted to the 25 milliliter mark of the flask with an ammonium chloride-ammonium buffer solution, and 0.25 milliliters of an 8.0% potassium ferricyanide solution was mixed thoroughly. After 5 minutes, a sample and a blank sample were prepared omitting the acetone extract were transferred to a spectophotometer cell, and absorbance was read at 475 MU. The results were compared with a standard curve prepared with known amounts of hexachlorophene. The results of these experiments are shown in TABLE IV and are given in terms of total amount of hexachlorophene detected per square centimeter of exposed enamel surface. The results of these tests indicate that use of the enamel conditioning dentifrice (K-821) resulted in the incorporation of hexachlorophene into the dental enamel, whereas, neither of the non-enamel conditioning dentifricies (26A or 26C) to which hexachlorophene had been added produced incorporation of the antibacterial agent into the enamel.

TABLE IV

| Results Product Used | Method of Extraction | μg Hexachlorophene cm² exposed enamel |
|---|---|---|
| K821 H(+1.0% Hexachlorophene) | Acetone (Soxhlet) | 101.89 |
| 26 $A_H$(+1.0% Hexachlorophene) | Acetone (Soxhlet) | 0 |
| 26 C-H(+1.0% Hexachlorophene) | Acetone (Soxhlet) | 0 | ors were planed and polished. A surface area of the bovine incisors was estimated by covering it with pieces of tin foil, the weight of which was compared with that of a piece of tin foil having a known surface area. The teeth were then brushed for three minutes manually with various dentifrices. After brushing, the teeth was thoroughly rinsed 3 times with 50 milliliters of distilled water to eliminate all remnants of the dentifrice. The teeth were then placed in a Soxhlet extraction apparatus The constituents of the various Products used are specified in TABLE XI.

A similar procedure was utilized to determine whether a topical treatment containing an antibacterial agent with and without an enamel conditioning agent enhance the incorporation of hexachlorophene into dental enamel. Bovine incisors were prepared essentially as described above and were given three minute topical applications of test solutions by means of a cotton swab. After treatment, the teeth were thoroughly rinsed 3 times with 25 milliliters of distilled water to eliminate all remnants of the topical solution. The teeth were then placed in a Soxhlet extraction apparatus with 100 milliliters of acetone and subject to hexachlorophene extraction for 6 hours. The aliquots of extracted solution were then analyzed for hexachlorophene as described above. The results of this test are illustrated in TABLE V, and these data indicate that topical solutions containing enamel conditioning agents substantially increase the enamel uptake of hexachlorophene per square centimeter of treated enamel.

1/100 dilution of a 24 hr. culture of streptococcus mutans 6715 (NIH). The test flasks were placed on a shaker water bath at 37°C and low speed, for 24 hours. A 0.5 ml sample was taken from each flask to make viable plate counts (anaerobically) on Gibbons-Fitzgerald agar medium (Incubation time: 48 hours). The results of the plate counts are compiled in TABLE VI and it is concluded from these data that increased antibacterial properties are displayed by the powdered enamel treated with an antibacterial agent plus enamel conditioning agent containing system over other systems tested.

TABLE VI

| System | | | Bacterial (Viable) Count × $10^6$ Treatment Time: | |
|---|---|---|---|---|
| | | | 5 Minutes | 20 Minutes |
| 1 | 20% Tween 80 in distilled water | (Control) | Contaminated | Contaminated |
| 2 | 1 plus 0.25% Fluorophene | | 4.65 | 11.35 |
| 3 | 2 plus 0.15% Fumaric Acid | | 6.4 | 1.95 |
| 4 | 3 plus 0.8% $K_2[SnF_2(C_2O_4)]$ | | 0.73 | 0.00745 |
| 5 | 4 plus 0.5% $P_2O_5$ and 0.5% $NH_4OH$ | | 16 | 0.25 |
| 2nd Run: Treatment time: 20 minutes | | | | |
| 1 | 20% Tween 80 in distilled water | (Control) | — | 1.275 |
| 2 | 1 plus 0.25% Fluorophene | | — | 4.55 |
| 3 | 2 plus 0.15% Fumaric Acid | | — | 0.23 |
| 4 | 3 plus 0.8% $K_2[SnF_2(F_2O_4)]$ | | — | 0.024 |
| 5 | 4 plus 0.5% $P_2O_5$ and 0.5% $NH_4OH$ | | — | 0.23 |

TABLE V

| Topical Treatment Solution System Used by Percent | | μg of Hexachlorophene per $Cm^2$ treated enamel |
|---|---|---|
| Hexachlorophene | 1.00 | 19.95 |
| Tween 80 | 2.00 | |
| Distilled Water | 97.00 | |
| Hexachlorophene | 1.00 | 148.74 |
| Tween 80 | 2.00 | |
| Fumaric Acid | .20 | |
| Distilled Water | 96.80 | |
| Hexachlorophene | 1.00 | 125.96 |
| Tween 80 | 2.00 | |
| Methyliminodiacetic Acid | .50 | |
| Distilled Water | 96.50 | |

In order to determine the residual antibacterial properties of powdered enamel treated with various enamel conditioning anti-plaque systems, the following studies were conducted.

Enamel powder was autoclaved to assure that the powder was steril. A 1.0 g sample of enamel powder was placed into a sterile test tube, and 10 ml of the test solution was added. The test tube was kept under constant shaking in the reciprocal shaker for 20 minutes. A second series was tested for 5 minutes. The enamel powder was separated by 10 min. centrifugation (12/3 range), and washed 3 times with a sterile phosphate buffer (0.1N, pH 7.0, 10 ml each wash). The enamel powder was then transferred into flasks containing 100 ml of thioglycollate medium innoculated with 0.1 ml of In order to determine the effectiveness of the present invention in inhibiting bacterial colonization on enamel blocks brushed with a dentifrice containing enamel conditioning agents and anti-plaque agents, the following studies were conducted. For these studies, properly sterilized bovine enamel sections were brushed with the experimental or control dentifrices, rinsed to eliminate paste remnants, and placed against the surface of blood sugar plates previously streaked with a culture of streptococcus mutans 6715 (NIH)*. After 48 and 72 hours of incubation, the sections were aseptically transferred into test tubes containing sterile Jordan medium**, and incubated for another 120 hours. The observations comprised the determination of presence or absence of inhibitory halos in the agar plates and presence or absence of bacterial growth (turbidity) in the test tubes. The results of this study are compiled in TABLE VII and it is concluded from these data that dentifrices containing both an antibacterial agent and an enamel conditioning agent are more effective in inhibiting the formation of bacterial colonization.

* This strain is known to be one of the heaviest plaque forming Streptococcus.
** The composition of Jordan's medium is as follows:

| Trypticase | 5 g | Salt Solution | |
|---|---|---|---|
| Yeast Extract | 5 g | $MgSO_4.7H_2O$ | 0.8 g |
| $K_2HPO_4$ | 5 g | $FeSO_4.7H_2O$ | 0.04 g |
| Salt Solution | 0.5 ml | $MnCl_2.4H_2O$ | 0.0189 g |
| $Na_2CO_3$ | 0.05 g | | |
| Sucrose | 50 g | Water g.s. | 100 ml |
| Water g.s. | 1000 ml | | |

TABLE VII

| Products | Enamel Conditioning Agents | Anti-bacterial Agents | Number of Colonies | | | | Liquid Medium Degree of Turbity After | | |
|---|---|---|---|---|---|---|---|---|---|
| | | | On the Impression of Tooth | | On the Tooth Surface | | | | |
| | | | 48 Hours | 72 Hours | 48 Hours | 72 Hours | 48 Hours | 72 Hours | 120 Hours |
| Control | — | — | 10 | 10 | Uncountable | | + | ++ | +++ |
| Ap T.25 | $K_2[SnF_2(C_2O_4)]$ | .25%TBS | 7 | 7 | 1 | 1 | clear | clear | + |
| Ap T1.0 | Same | 1.0%TBS | 3 | 5 | 9 | 10 | clear | clear | ++ |
| Ap F.25 | Same | .25% Fluorophene | 2 | 2 | 1 | 1 | clear | clear | clear |

TABLE VII — Continued

| Products | Enamel Conditioning Agents | Anti-bacterial Agents | Number of Colonies | | | | Liquid Medium Degree of Turbity After | | |
|---|---|---|---|---|---|---|---|---|---|
| | | | On the Impression of Tooth | | On the Tooth Surface | | | | |
| | | | 48 Hours | 72 Hours | 48 Hours | 72 Hours | 48 Hours | 72 Hours | 120 Hours |

*The degree of turbity was a visual estimate of the optical density as compared to the optical density as read in a Klett Spectrophotometer using a No. 66 filter. The following table indicates the relative values.

| Assigned Value | Klett Reading |
|---|---|
| Clear | 10 ± 5 |
| + | 100 ± 15 |
| ++ | 200 ± 30 |
| +++ | 300 ± 50 |

In order to determine the effectiveness of dentifrices in accordance with the present invention in inhibiting the formation of in vitro formation of dental plaque, the following test procedure was followed. Two contiguous enamel segments from bovine teeth of equivalent surfaces were respectively brushed with an experimental dentifrice and a control for 5 minutes under 150 grams pressure. The teeth, the toothbrushes, the brushing machine and the holders were sterilized to prevent contamination of the enamel segments. After careful rinsing of the enamel segments to eliminate all toothpaste remnants, the enamel segments were immersed for 5 days in Jordan's medium innoculated with plaque-forming streptococcus bacteria. The enamel segments were transferred daily to freshly innoculated Jordan's medium. At the end of 5 days, the accumulated dental plaque was collected on aluminum planchets and weighed immediately (wet) and after drying. TABLES VIII & IX, which illustrate the results of that test, indicate that in each case, inclusion of an antibacterial agent substantially reduced the formation of dental plaque over a control dentifrice without an antibacterial agent. On the basis of this data, it is seen that various enamel conditioning agent-containing dentifrices having antibacterial agents added are significantly more effective in reducing the plaque accumulation in vitro. The fact that very high reductions in plaque accumulation are obtained after 5 days of innoculation in an aqueous bacterial culture medium and following only one initial brushing indicates that the effect of the treatment is prolonged and leads to the conclusion that the present invention is effective even for persons who do not brush their teeth every day.

TABLE VIII

| Results Comparison | Active Plaque Ingredient | Plaque Weight Control (mg±S.E.) | Plaque Weight Experiment (mg±S.E.) | Difference (mg) | "t" Value | "%" Prevention |
|---|---|---|---|---|---|---|
| 26C and 26 CH | — 1.0% Hexachlorophene | wet 8.050±.28 dry 3.425±48 | 4.150±.40 1.150±.46 | 3.900 2.275 | 8.02 3.41 | 48.45 66.42 |
| K821* and K821H | — 1.0% Hexachlorophene | wet 7.500±.11 dry 2.325±.48 | 0.075±.50 0.025±.50 | 7.425 2.300 | 14.61 3.31 | 99.00 98.92 |
| X101* and X101H | — 1.0% Hexachlorophene | wet 6.250±.43 dry 3.550±.48 | 0.050±.50 0.025±.50 | 6.200 3.525 | 9.44 5.08 | 99.20 99.30 |
| K821 and KT 1.0 | — 0.1% TBS | wet 5.175±.48 dry 3.275±.49 | 5.675±.17 2.125±.47 | −0.500 1.150 | 0.98 1.69 | −9.67 35.11 |

The formulae of these products are included in Table VI.
*Products K821 and X101 contain enamel conditioning agents; the control products does not.

TABLE IX

| Products* Control | Products* Experimental | Plaque Condition | Mean Plaque Weight and Differences Control (mg ± S.E.) | Experimental (mg ± S.E.) | Diff. (mg) | P value | % Red. |
|---|---|---|---|---|---|---|---|
| Control | 295C (Control +.25% Fluorophene) | wet dry | 12.18±.07 7.70±.49 | 1.60±.42 .73±.50 | 10.58 6.98 | <.001 <.001 | 86.86 90.58 |
| K-821 | 295D (K-821 +.25% Fluorophene) | wet dry | 6.35±.49 4.33±.49 | .10±.49 .05±.50 | 6.25 4.28 | <.001 <.001 | 98.43 98.84 |
| K-821 | 295E (K-821 +.25% Fluorophene +3.0% EHDP) | wet dry | 6.15±.48 3.98±.47 | .18±.48 .13±.49 | 5.98 3.85 | <.001 <.001 | 97.15 96.86 |
| K-821 | 295G (K-821 +.25% Fluorophene +5.0% Victamide) | wet dry | 6.33±.49 4.25±.47 | .10±.49 .05±.50 | 6.23 4.20 | <.001 <.001 | 98.42 98.82 |

*The formulae of these products are included in Table XI.

In order to determine the effectiveness of various dentifrices in reducing the in vivo plaque formation in rats the following test procedure was utilized. A total of 100 weanling litter mate Wistar rats were divided randomly into 5 equal groups according to sex and litter. Animals were weighed and ear-marked at the initiation of the study and final individual body weights were determined individually prior to sacrifice. All animals were housed in raised wire cages and were provided with distilled water and a plaque-producing diet ad libitum. The composition of the plaque-producing diet was as follows:

| Confectioners Sugar | 56% |
|---|---|
| Skimmed Milk Powder | 28% |
| Whole Wheat Flour | 6% |
| Brewers Yeast | 4% |
| Powdered Alfalfa | 3% |
| Liver Powder | 1% |
| Sodium Chloride | 2% |

Prior to starting the treatment and at one week intervals thereafter, the existing plaque was carefully scored. In scoring the formation of plaque, any soft accretion on the surface of a tooth that would retain basic fuchsin was considered as "dental plaque". The quantitative estimate of the amount of surface and the lingual aspect of first and second molars of both jaws was scored as follows:

Score

0 — the absence of dental plaque on the respective surface of a tooth

1 — the presence of dental plaque covering less than one third of the respective surface 2 — the presence of dental plaque covering between one and two thirds of the respective surface of the tooth.

3 — the presence of dental plaque covering two-thirds or more of the respective surface of the tooth.

In order to convert the dental plaque score into a percentage score, the individual score of each tooth was added to get a total aminal score. This total score was divided by 36 (which is the highest possible theoretical score) and the quotient multiplied by 100. The resulting figure was considered the percentage score for the animal in question.

The treatment consisted of twice daily applications of 1:1 slurry of the respective dentifrice-water with the aid of a cotton applicator. Each quadrant (maxillary and mandibular) was given three strokes with the applicator using a rolling motion to insure treatment of the buccal and lingual surfaces. The applicator was resaturated with the treatment dentifrice slurry between quadrants. The various treatments were administered twice daily for five days per week throughout a 3 week experimental period. The results of this test are illustrated in TABLE X which illustrate that the inclusion of the antibacterial agent fluorophene in an enamel conditioning dentifrice substantially reduces the in vivo formation of dental plaque in rats. While use of all of the experimental systems resulted in reduced plaque formation, the system of this invention (Group 5) was significantly better than all of the others (Group 2–4). Indeed, Group 5 had 54.0% less plaque than the next best group (Group 3), a result that is highly significant ($P<0.005$).

The formulae of the various dentifrice compositions utilized in the above experimental evaluations are included in TABLE XI.

TABLE X

| Group | Product | Initial | Mean Plaque Scores ±S.E. 1 Week | 2 Weeks | 3 Weeks | Difference Initial - 3 Weeks | Comparison of the Differences with Water Control After 3 Weeks %Diff. | P |
|---|---|---|---|---|---|---|---|---|
| 1 | Distilled Water | 4.17±1.02 | 33.39±2.29 | 50.28±1.84 | 69.25±2.89 | 65.09±3.23 | — | — |
| 2 | 26C (Control) | 3.47±.83 | 26.33±2.75 | 35.47±1.11 | 41.81±1.11 | 38.33±1.20 | −41.11 | <0.001 |
| 3 | 26 CF (Control + .25% Fluorophene) | 4.03±1.00 | 14.44+2.70 | 22.22±3.04 | 26.67±2.48 | 22.64±2.33 | −65.22 | <0.001 |
| 4 | K-821 (Control + enamel condition agent) | 3.20±1.02 | 22.22±2.51 | 25.28±3.27 | 40.13±1.73 | 36.94±2.10 | −43.25 | <0.001 |
| 5 | KF.25A (K-821 + .25% Fluorophene) (Control + enamel conditioning + antiseptic agent) | 3.75±1.20 | 11.38±2.62 | 7.78±2.69 | 14.17±3.33 | 10.41±3.24 | −83.99 | <0.001 |

The formulae of these products are included in Table VI.

TABLE XI

FORMULAE FOR DENTIFRICES CONTAINING DIFFERENCE COMBINATION SYSTEMS

| Constituent | 26C | K821 | 295-C | 295-D | Group 295-E | 295-G | X101 | KF.25 | KT1.0 |
|---|---|---|---|---|---|---|---|---|---|
| Anti-Bacterial System | | | | | | | | | |
| Fluorophene | — | — | .25 | .25 | .25 | .25 | — | .25 | — |
| TBS | — | — | — | — | — | — | — | — | 1.00 |
| Enamel Conditioning System | | | | | | | | | |
| Victamide | — | — | — | — | — | 5.00 | 3.470 | — | — |
| $H_2Na_2EHDP$ | — | — | — | — | 3.00 | — | — | — | — |
| $K_2Oxalate$ | — | .486 | — | .486 | .486 | .486 | — | .486 | .486 |
| Fumaric Acid | — | .150 | — | .150 | .150 | .150 | .150 | .150 | .150 |
| Precipitating System | | | | | | | | | |
| $SnF_2$ | — | .413 | — | .413 | .413 | .413 | — | .413 | .413 |
| $P_2O_5$/Water | — | .500 | — | .50/5.00 | .50/5.00 | .50/5.00 | — | .500 | .500 |
| $AlF_3 \cdot 3H_2O$ | — | — | — | — | — | — | 0.243 | — | — |
| Abrasive System | | | | | | | | | |
| $Ca_2P_2O_7$(Improved) | — | 36.90 | 30.00 | 30.00 | 30.00 | 30.00 | 33.00 | 30.00 | 30.00 |
| $ZrSiO_4$ (Excellopax) | — | 12.30 | 10.00 | 10.00 | 10.00 | 10.00 | 11.00 | 10.00 | 10.00 |
| $Ca_2P_2O_7$ (Regular) | 43.33 | | | | | | | | |

TABLE XI – Continued

FORMULAE FOR DENTIFRICES CONTAINING DIFFERENCE COMBINATION SYSTEMS

| Constituent | 26C | K821 | 295-C | 295-D | Group 295-E | 295-G | X101 | KF.25 | KT1.0 |
|---|---|---|---|---|---|---|---|---|---|
| Excipients | | | | | | | | | |
| Water | 22.15 | 18.501 | 19.50 | 10.951 | 11.821 | 10.82 | 20.987 | 22.50 | 22.551 |
| Glycerine | 10.00 | 10.000 | 18.00 | 18.00 | 14.13 | 13.13 | 10.000 | 19.301 | 18.000 |
| Sorbitol | 20.00 | 15.000 | 15.00 | 15.00 | 15.00 | 15.00 | 16.000 | 10.000 | 10.000 |
| Na A.S. | .69 | 1.200 | 1.20 | 1.20 | 1.20 | 1.20 | 1.20 | — | — |
| Veegum F. | .40 | .500 | .50 | .50 | .50 | .50 | .50 | 0.50 | 0.50 |
| C.M.C. (7HOF) | 1.50 | 1.000 | 1.00 | 1.00 | 1.00 | 1.00 | 1.00 | 1.00 | 1.00 |
| Saccharin-Na | .12 | .200 | .50 | .50 | .50 | .50 | .20 | 0.60 | 0.60 |
| Flavor | .85 | .850 | .85 | .85 | .85 | .85 | .85 | 0.40 | 0.40 |
| Polyethylene Glycol 400 | | — | 2.00 | 2.00 | 2.00 | 2.00 | — | 2.00 | 2.50 |
| Monoglyceride Sulfonate | 0.81 | | | | | | | | |
| Buffer System | | | | | | | | | |
| $K_2$-acid Phtalate | 1.20 | 1.200 | 1.20 | 1.20 | 1.20 | 1.20 | 1.20 | 1.20 | 1.20 |
| Color (blue) | .15 | .300 | — | — | — | — | .20 | .20 | .20 |
| $NH_4OH$/Water | — | .500 | — | .50/1.50 | .50/1.50 | .50/1.50 | — | .500 | .500 |

Thus, the enamel conditioning antibacterial agent containing compositions of this invention and the methods for their use provide a striking advance over prior art compositions in their prevention and control of dental plaque.

In order to determine the toxicity of the antibacterial agents used in the above studies the effects of dentifrice preparations containing fluorophene and TBS and mixtures thereof at the upper level of concentration of the present invention on the oral mucosa of rats was determined using conventional procedures. These studies concluded that both fluorophene and TBS have a high margin of safety and are substantially less toxic than hexachlorophene, a commonly used agent in mouthwashes. For example, the $LD_{50}$ for 100% active TBS is 570 mg/kg whereas the $LD_{50}$ for hexachlorophene is 125 mg/kg when tested under similar conditions. Further, a force fed diet of 2.0 g/kg/body weight of fluorophene in a corn oil suspension to five adult mice caused no deaths. Thus, it should be apparent that TBS and fluorophene are substantially less toxic than the commonly orally utilized antibacterial agent hexachlorophene.

I claim:

1. A method of removing dental plaque from and inhibiting the formation of dental plaque on dental enamel comprising the application thereof of a composition comprising:

about 0.0–50% by weight of a non-toxic antibacterial agent selected from the group consisting of hexachlorophene, tribromosalicylanilide, 3, 5-dibromo-3' trifluoromethyl-salicylanilide, p-aminosalicyclic acid, and p-aminobenzoic acid; and 0.01–10% by weight of fumaric acid.

2. A method of removing dental plaque from an inhibiting the formation of dental plaque on dental enamel comprising the application thereto of a composition comprising:

about 0.01–50% by weight of a non-toxic antibacterial agent selected from the group consisting of hexachlorophene, tribromosalicylanilide, 3, 5-dibromo-3' trifluoromethylsalicylanilide, p-aminosalicyclic acid, and p-aminoaobenzoic acid; and 0.01–10.0% by weight of a difluoroxalatostannate (II) complex.

* * * * *

UNITED STATES PATENT OFFICE
CERTIFICATE OF CORRECTION

Patent No. 3,897,548　　　　　　　　　Dated　July 29, 1975

Inventor(s)　Simon Katz

It is certified that error appears in the above-identified patent and that said Letters Patent are hereby corrected as shown below:

Column　3, line 56 - insert asterisk (*) after "complexes"

line 57 - "diflourokaltostannate" should read
　　　　　　-- diflouroxalatostannate --

Column　5, line 30 - insert "an" before "antibacterial"

line 42 - "percent" should read -- present --

Column 10, line　6 - "0.1-2.5%" should read -- 0.01-2.5% --

Column 12, line 47 - "was" should read -- were --

Column 20, line　8 - "aminal" should read -- animal --

Column 22, line 21 - "0.0-50%" should read -- 0.01-50% --

Signed and Sealed this fourteenth Day of October 1975

[SEAL]

Attest:

RUTH C. MASON　　　　　　　　　　C. MARSHALL DANN
*Attesting Officer*　　　　　　　*Commissioner of Patents and Trademarks*